Dec. 17, 1929.          A. E. HALL          1,740,087

SHEAVE STRUCTURE

Filed Dec. 30, 1927          2 Sheets-Sheet 1

Inventor
A. E. Hall
by
Attorney

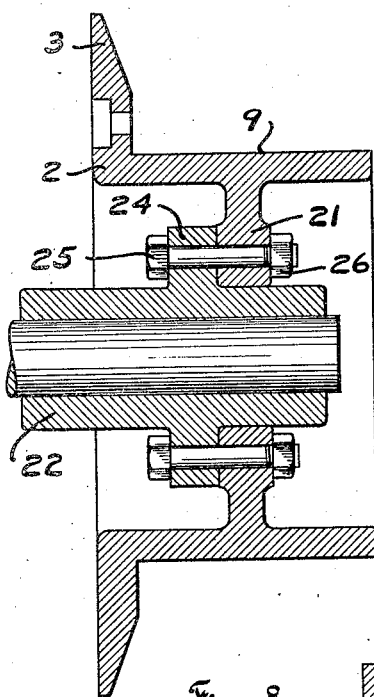
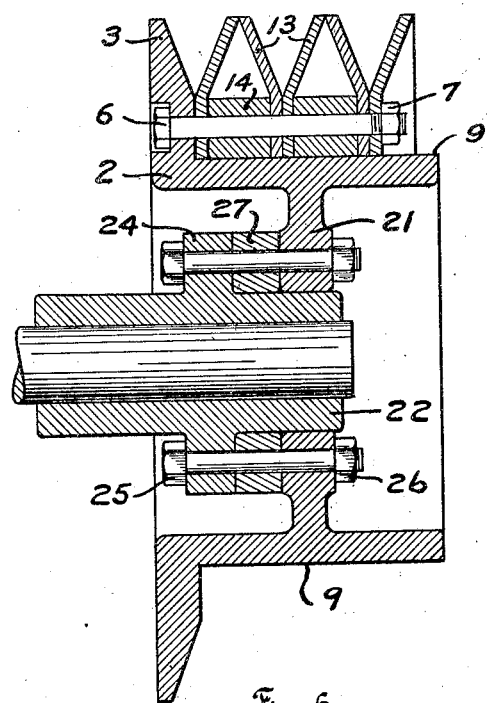
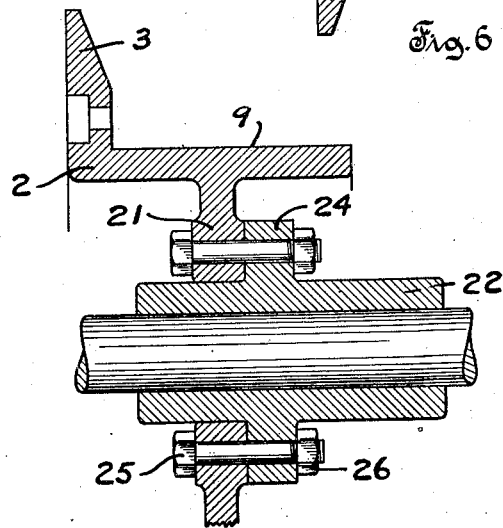

Patented Dec. 17, 1929

1,740,087

UNITED STATES PATENT OFFICE

ALLAN E. HALL, OF WAUWATOSA, WISCONSIN, ASSIGNOR TO ALLIS-CHALMERS MANUFACTURING COMPANY, OF MILWAUKEE, WISCONSIN, A CORPORATION OF DELAWARE

SHEAVE STRUCTURE

Application filed December 30, 1927. Serial No. 243,532.

The present invention relates generally to improvements in power transmitting mechanisms, and relates more specifically to improvements in the construction of sheaves for V-belt drives or the like.

An object of the invention is to provide a new and useful sheave structure for V-belt drives especially multiple V-belt drives, which may be readily manufactured and which is capable of adjustment to fulfill various operating conditions. A further object of the invention is to provide an improved wall structure for the grooves of sheaves, which may be readily assembled to produce sheaves having a variable number of grooves, and also adapted to vary the width of the grooves so as to operate at different pitch diameters. Still another object of the invention is to provide an improved hub for rotary sheaves or the like, whereby the grooves of the sheave may be readily adjusted to assume various positions longitudinally of the axis of a driving shaft. A further object of the invention is to provide a sheave for multiple belt drives, wherein the walls of the grooves are laterally elastic. These and other objects of the invention will be apparent from the following description.

A clear conception of several embodiments of the invention and of the mode of manufacturing and of assembling sheaves in accordance with the improvement, may be had by referring to the drawings accompanying and forming a part of this specification in which like reference characters designate the same or similar parts in the various views.

Fig. 6 is a central longitudinal section through the hub structure and a portion of the rim of one of the improved sheaves, illustrating the manner of adjusting such structure relative to the driving shaft.

Fig. 7 is a fragmentary longitudinal sectional view through the hub structure, showing the same in a different position of adjustment from that disclosed in Fig. 6.

Fig. 8 is a central longitudinal section through the hub structure, showing the same in still another position of adjustment.

Figure 1:
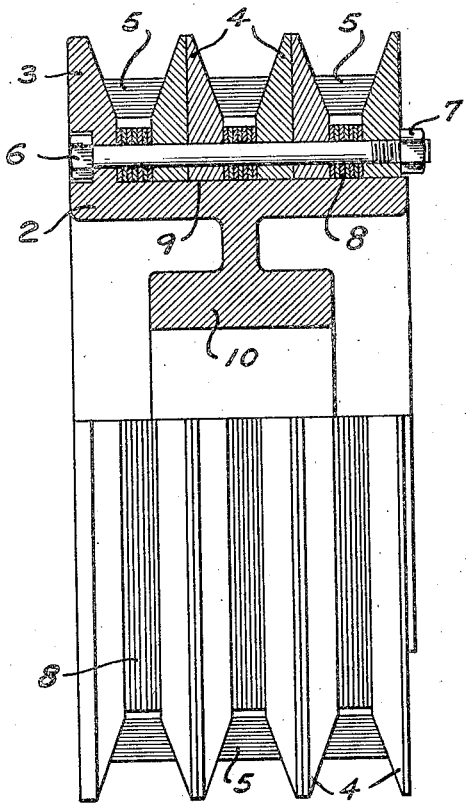
Fig. 1 is a part sectional side elevation of an improved sheave structure, showing a series of V-belts cooperating with the grooves thereof.
Figure 2:
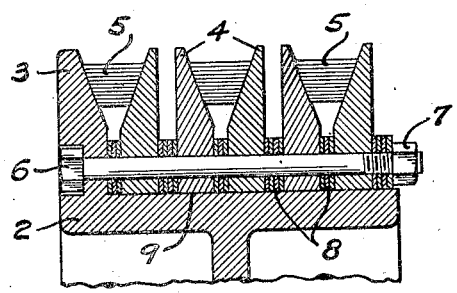
Fig. 2 is a fragmentary sectional view through the rim portion of a sheave such as shown in Fig. 1, showing the grooves adjusted to cause the belts to ride therein on greater pitch diameters.

Referring specifically to the embodiments of the invention shown in Figs. 1 and 2, the improved sheave comprises a hub 10 having a circular rim 2 and an end wall or flange 3 cast integral therewith. The end wall 3, as shown, has a frusto conical side surface, and the rim 2 is provided with a cylindrical outer surface 9. A series of circular members 4 embrace the cylindrical surface 9 of the hub and are provided with frusto conical side surfaces which cooperate with the side surfaces of the flange 3, and with each other, to provide a series of continuous annular V-grooves, as shown. Located between some of the annular members 4, are shims 8 which are capable of being removed and inserted in various positions relative to the members 4, as shown in Figs. 1 and 2. The shims 8 and the members 4 are capable of being locked together and to the end flange 3 by means of a series of bolts 6 and nuts 7 coacting with the bolts 6 to clamp the elements together. During normal use of the sheave, V-belts 5 are adapted to cooperate with the grooves formed by the members 4 and the end flange 3, as shown in the drawing, and the pitch diameters on which the belts 5 ride in the grooves of the sheave, may be readily varied by locating the shims 8 in different positions relative to the members 4 as indicated.

Figure 3:
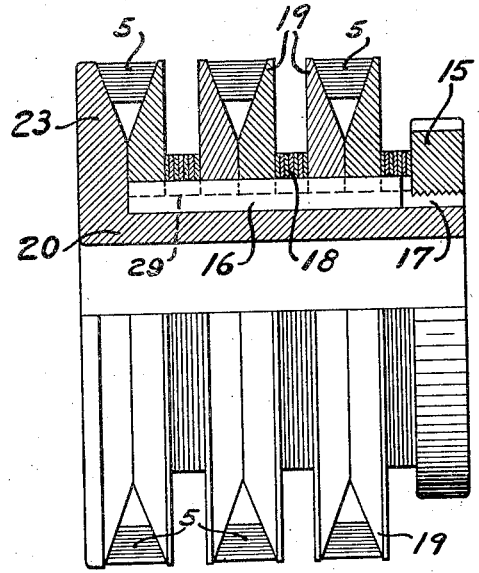
Fig. 3 is a part sectional side elevation of a modified form of sheave structure, showing the belts cooperating with the grooves thereof.

In the embodiment of the invention illustrated in Fig. 3, the sheave comprises a hub 20 having an end flange 23 formed integral therewith, and provided with a cylindrical peripheral surface 29 extending away from the end flange 23. The end flange 23 has a frusto conical side surface, and the cylindrical surface 29 of the hub 20 is embraced by means of a series of circular members 19 having notches therein adjoining the surface 29. The circular members 19 are also provided with frusto conical side surfaces which cooperate with the side surfaces of the flange 23 and with each other, to provide a series of continuous annular V-grooves, as shown. Shims 18 may be located between the members 19 in order to properly space these members relative to each other, these shims likewise being provided with notches adjoining the surface 29. The hub 20 is provided with a keyway 17 with which the notches of the members 19 and shims 18 are alineable in order to receive a key 16 which serves to prevent relative rotation of the members 19 and of the shims 18 relative to the hub 20. A ring nut 15 engaging screw threads at the end of the hub 20 remote from the flange 23, serves to clamp the members 19 and the shims 18 against each other and against the flange 23. V-belts 5 are adapted to coact with the grooves formed by the cooperating members 19, during normal operation of the sheave.

Figure 4:
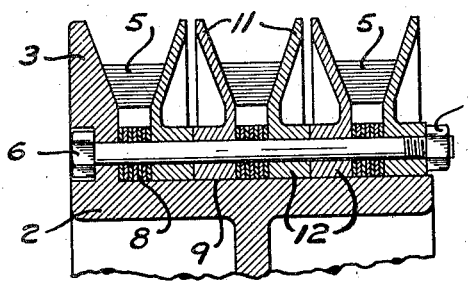
Fig. 4 is a fragmentary sectional view through the rim portion of another form of sheave embodying the improvement.

In the specific embodiment of the invention illustrated in Fig. 4, the rim 2 of the hub is formed as in Figs. 1 and 2, and the cylindrical peripheral surface thereof is embraced by means of a series of circular members 11 having outer relatively flexible portions which form the walls of the grooves. The spacing portions 12 of the members 11 are formed to cooperate with each other and with shims 8 so as to properly position the V-grooves formed by the members 11, upon the rim 2. It will be apparent that the members 11 are adjustable along the rim 2 in a manner similar to that illustrated in Figs. 1 and 2, and the members 11 and shims 8 are locked against rotation and against displacement with respect to the rim 2, by means of bolts 6 and nuts 7.

Figure 5:
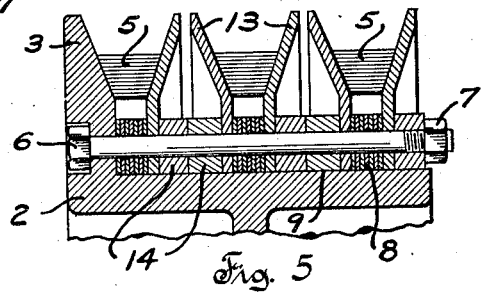
Fig. 5 is a fragmentary sectional view of still another form of the improved sheave structure.

In the specific embodiment of the invention shown in Fig. 5, the hub structure is the same as that disclosed in Figs. 1 and 2, but the groove forming members 13 are formed of sheet metal, in any suitable manner. These sheet metal members 13 cooperate with spacing rings 14 and shims 8 to provide grooves of proper width and spacing, and the sheet metal side walls may be formed of material which will produce the desired flexibility in the sheave. The members 14 are obviously adjustable in a manner similar to that illustrated in Figs. 1 and 2 and they are retained in position upon the rim 2 by means of bolts 6 and clamping nuts 7.

The hub of the sheave may be formed as illustrated in Figs. 6, 7 and 8 for the purpose of permitting adjustment of the grooves along the hub axis. As illustrated in these figures, the sheave hub comprises a rim portion or rim 2 and a central supporting member 22, the latter being adapted for direct attachment to a shaft. The supporting member 22 is provided with a flange or abutment projection 24 preferably formed integral with the member 22 and disposed off center with respect to the ends of the member. The rim 2 is provided with an inwardly extending flange 21 adapted to interchangeably coact with opposite sides of the abutment projection 24 as shown in Figs. 6 and 8, this flange likewise being disposed off center relative to the rim ends. In order to secure further adjustment or variation in the relative position of the rim 2 upon the member 22, a spacer 27 may be inserted between the flange 21 and the projection 24, as shown in Fig. 6. The flange 21 and the projection 24 may be tied together or rigidly united by means of bolts 25 and clamping nuts 26. these bolts and nuts permitting convenient assembling and dismantling of the sheave structure.

It will be apparent that with the improved structure, the sheaves may be readily adjusted to produce desired variations in the pitch diameter of the driving belts 5 and in the distances between the several belts. The elements constituting a sheave may be readily carried in stock and assembled to cooperate with any desired number of belts. The adjustable hub structure disclosed in Figs. 6, 7 and 8 permits variation in the position of the sheave with respect to the driving shaft so that if the position of this shaft is fixed, the position of the grooves with respect to the shaft may be readily varied to accommodate various conditions of operation. The use of flexible walls for the sheave grooves, as illustrated in Figs. 4 and 5, also enables the use of relatively inelastic belts 5, while insuring effective operation of the drive. It will be understood that the sheave structure disclosed herein may be caused to cooperate with another sheave constructed in a like manner, or in any other manner, and may in some cases be caused to cooperate with a sheave having a cylindrical driving surface instead of one provided with grooves.

It should be further understood that it is not desired to limit the invention to the exact details of construction herein shown and described, for various modifications within the scope of the claims may occur to persons skilled in the art.

It is claimed and desired to secure by Letters Patent:

1. In combination, a rim, means providing V-grooves at the periphery of said rim, a supporting member having a projection, a spacer cooperable with said projection, and means for effecting interchangeable attachment of said rim to said spacer and said projection.

2. In combination, a rim having V-grooves at the periphery therof, a supporting member having laterally spaced abutment surfaces, a spacer cooperable with said surfaces, and means for effecting interchangeable attachment of said rim to said surfaces through said spacer.

3. In combination, a hub having an annular surface extending longitudinally of the hub axis, a plurality of circular members embracing said surface and adjustable therealong, said members coacting with each other to form a series of annular V-grooves surrounding said axis, and a plurality of spacers interchangeably cooperable with the opposite sides of said members to vary both the pitch diameters of said grooves and the positions of said grooves along said surface.

4. In combination, a hub having a cylindrical external surface extending longitudinally of the hub axis, a plurality of circular members snugly embracing said surface and adjustable therealong, said members coacting with each other to form a series of annular V-grooves surrounding said axis, a plurality of spacers interchangeably cooperable with opposite sides of said members to vary both the pitch diameters of said grooves and the positions of said grooves along said surface, and means for locking each of said members directly to said hub.

5. In combination, a hub having an integral end flange and an annular surface extending away from said flange longitudinally of the hub axis, a plurality of circular members embracing said surface and adjustable therealong, said members coacting with said flange and with each other to form a series of annular V-grooves surrounding said axis, and a plurality of spacers interchangeably cooperable with opposite sides of said members to vary both the pitch diameters of said grooves and the positions of said grooves along said surface and relative to said flange.

6. In combination, a hub having an integral end flange and a cylindrical surface extending away from said flange longitudinally of the hub axis, a plurality of circular members embracing said surface and adjustable therealong, said members coacting with said flange and with each other to form a series of annular V-grooves surrounding said axis, a plurality of spacers interchangeably cooperable with opposite sides of said members to vary both the pitch diameters of said grooves and the positions of said grooves along said surface and relative to said flange, and means for locking each of said members directly to said hub.

7. In combination, a hub having an annular surface extending longitudinally of the hub axis, a plurality of circular members embracing said surface and adjustable therealong, said members having elastic portions coacting with each other to form a series of annular V-grooves surrounding said axis and providing resilient side driving surfaces, and a plurality of annular spacers embracing said surface and interchangeably cooperable with opposite sides of said members to vary both the pitch diameters of said grooves and the positions of said grooves along said surface.

8. In combination, a hub having an annular surface extending longitudinally of the hub axis, a plurality of circular members embracing said surface and adjustable therealong, said members coacting with each other to form a series of annular V-grooves surrounding said axis, and a plurality of relatively thin annular spacers embracing said surface and interchangeably cooperable with opposite sides of said members to vary both the pitch diameters of said grooves and the positions of said grooves along said surface.

9. In combination, a hub, a plurality of circular members embracing said hub and spaced apart, said members having elastic portions coacting with each other to form a series of annular V-grooves of equal pitch diameter surrounding the axis of said hub and providing resilient side driving walls, and a plurality of relatively incompressible endless V-belts having side driving contact with said resilient walls.

In testimony whereof, the signature of the inventor is affixed hereto.

ALLAN E. HALL.